United States Patent
Godshaw et al.

(10) Patent No.: US 7,261,375 B2
(45) Date of Patent: Aug. 28, 2007

(54) AUTOMOBILE PET BED CONSTRUCTION

(75) Inventors: Donald E. Godshaw, Evanston, IL (US); Andrezj M. Redzisz, Wheeling, IL (US)

(73) Assignee: Travel Caddy, Inc., Elk Grove Village, IL (US)

( * ) Notice: Subject to any disclaimer, the term of this patent is extended or adjusted under 35 U.S.C. 154(b) by 339 days.

(21) Appl. No.: 10/832,545

(22) Filed: Apr. 27, 2004

(65) Prior Publication Data

US 2005/0253444 A1   Nov. 17, 2005

(51) Int. Cl.
A47C 31/00 (2006.01)
A01K 29/00 (2006.01)
A47D 7/04 (2006.01)

(52) U.S. Cl. ............... 297/228.12; 297/229; 297/219.1; 119/28.5; 5/94

(58) Field of Classification Search ........... 297/228.11, 297/228.12, 228.13, 219.1, 228.1, 229, 463.2; 119/28.5, 771, 727, 725; 5/94, 118
See application file for complete search history.

(56) References Cited

U.S. PATENT DOCUMENTS

| | | | |
|---|---|---|---|
| 400,131 A * | 3/1889 | Small | 5/122 |
| 1,882,169 A * | 10/1932 | Wedler | 297/228.12 |
| 1,959,974 A * | 5/1934 | Westgate | 5/94 |
| 2,254,332 A * | 9/1941 | Tibbetts | 297/250.1 |
| 2,601,488 A * | 6/1952 | Allen | 5/94 |
| 2,627,303 A * | 2/1953 | Bard | 297/223 |
| 2,641,773 A * | 6/1953 | Kramer | 5/94 |
| 3,276,512 A * | 10/1966 | Gallagher | 160/368.1 |
| 3,321,240 A * | 5/1967 | Lilienstern et al. | 297/184.11 |
| 3,436,770 A * | 4/1969 | Turner | 5/94 |
| 3,574,872 A * | 4/1971 | Mattila | 5/94 |
| 4,487,451 A * | 12/1984 | Fiorini | 297/219.1 |
| 4,924,814 A * | 5/1990 | Beaudet | 119/712 |
| 4,943,105 A * | 7/1990 | Kacar et al. | 296/24.31 |
| 5,123,699 A * | 6/1992 | Warburton | 297/219.1 |
| 5,133,294 A * | 7/1992 | Reid | 119/771 |
| 5,188,421 A * | 2/1993 | Arseneault | 297/182 |
| 5,294,166 A * | 3/1994 | Shapland | 296/97.23 |
| 5,474,329 A * | 12/1995 | Wade et al. | 280/749 |
| 5,487,361 A * | 1/1996 | Dean | 119/28.5 |
| 5,642,917 A * | 7/1997 | Geiger | 297/219.12 |
| 5,878,672 A * | 3/1999 | Ostermann et al. | 108/44 |
| 6,327,726 B1 * | 12/2001 | Weber | 5/655 |
| 6,341,812 B1 * | 1/2002 | Knoll | 296/180.1 |
| 6,676,209 B1 * | 1/2004 | Szabo et al. | 297/219.1 |

FOREIGN PATENT DOCUMENTS

DE   4238363 A  *  5/1993

* cited by examiner

Primary Examiner—David R. Dunn
Assistant Examiner—Tania Abraham
(74) Attorney, Agent, or Firm—Banner & Witcoff, Ltd.

(57) ABSTRACT

A sling construction in the form of a hammock includes a number of panels stitched together in the form of an open top container for placement in the back seat of a motor vehicle to protect the interior of the vehicle and to further protect animals within the sling construction.

21 Claims, 5 Drawing Sheets

AUTOMOBILE PET BED CONSTRUCTION

BACKGROUND OF THE INVENTION

In a principal aspect the present invention relates to a sling or hammock construction for maintaining a pet safely on a vehicle seat, particularly the back seat behind a driver and passenger.

When traveling with a pet, particularly a pet that may be large or sheds fur, placement of the pet in the back seat of a vehicle often results in rendering the back seat untidy and unclean. Fur which has been shed and dirt from the animal may result in making the back seat unsuitable or unusable by a subsequent passenger. Additionally, if a pet is placed in the back seat of a vehicle, the pet may be thrown forward and injured in the event of a sudden stop.

Thus, there has developed the need for means to not only protect the interior upholstery of a vehicle, including the seat and floor area behind the driver and passenger front compartment, but also a means to enhance the safety of a pet placed in the back seat of a vehicle. Merely attaching the pet to a safety belt by means of a leash may not be appropriate or safe. Retaining the pet in a seatbelt will, of course, not be feasible. Thus, the need described has become an important factor, particularly with people who have pets as their companions.

SUMMARY OF THE INVENTION

Briefly, the present invention comprises a sling construction which forms a hammock-type structure that is adapted to be suspended or attached into the back seat of a vehicle behind the front seat driver and passenger area. The sling construction includes a bottom panel which fits against the back seat of the vehicle and connected side panels which together form an open top, sack shaped protective enclosure for the pet. The sling construction is fabricated from a material such as a canvas or heavy cloth material and includes various fastening mechanisms which attach the sling construction or hammock-like construction to the backside of the front seat, and in particular the headrests as well as the headrest of the back seat. Side straps with magnetic attachment devices effect attachment of the sides of the sling construction to the vehicle chassis. Openings are provided in the panels for receipt of a vehicle seatbelt through the bottom of the sling construction enabling attachment of a leash for the animal.

Thus, the sling construction is generally made from a comfortable, flexible material which provides a safety compartment for the animal retained therein. Various straps attach the sling construction to the seat and to the chassis of the vehicle. Additionally, by providing openings in the bottom of the sling construction, seatbelts may be fitted through the sling construction to enable use by human passengers without necessitating total removal of the sling construction from the back seat. Various alternative strap and attachment assemblies are also available to enhance the utility of the sling construction.

Thus, it is an object of the invention to provide improved sling-type construction for placement in the back seat of a vehicle for use by an animal to enhance the safety of the animal and further to provide a means to protect the vehicle seat.

It is a further object of the invention to provide an economical, yet easily usable, rugged sling construction for placement in a motor vehicle and, in particular, in the back seat thereof for protection and transport of an animal.

Yet another object of the invention is to provide a portable or removable sling construction for use in the back seat of a motor vehicle wherein the sling construction may be at least partially detached from its typical service position to thereby enable a passenger to use the sling construction as a seat pad and further wherein the sling construction permits the utilization of seat belts through openings provided in the panels of the sling construction.

Yet another object of the invention is to provide a sling construction for the back seat of a motor vehicle which protects the interior upholstery of the vehicle.

These and other objects, advantages and features of the invention will be set forth in the detailed description which follows.

BRIEF DESCRIPTION OF THE DRAWING

In the detailed description which follows reference will be made to the drawing comprised of the following Figures.

DESCRIPTION OF THE PREFERRED EMBODIMENTS

Figure 1:
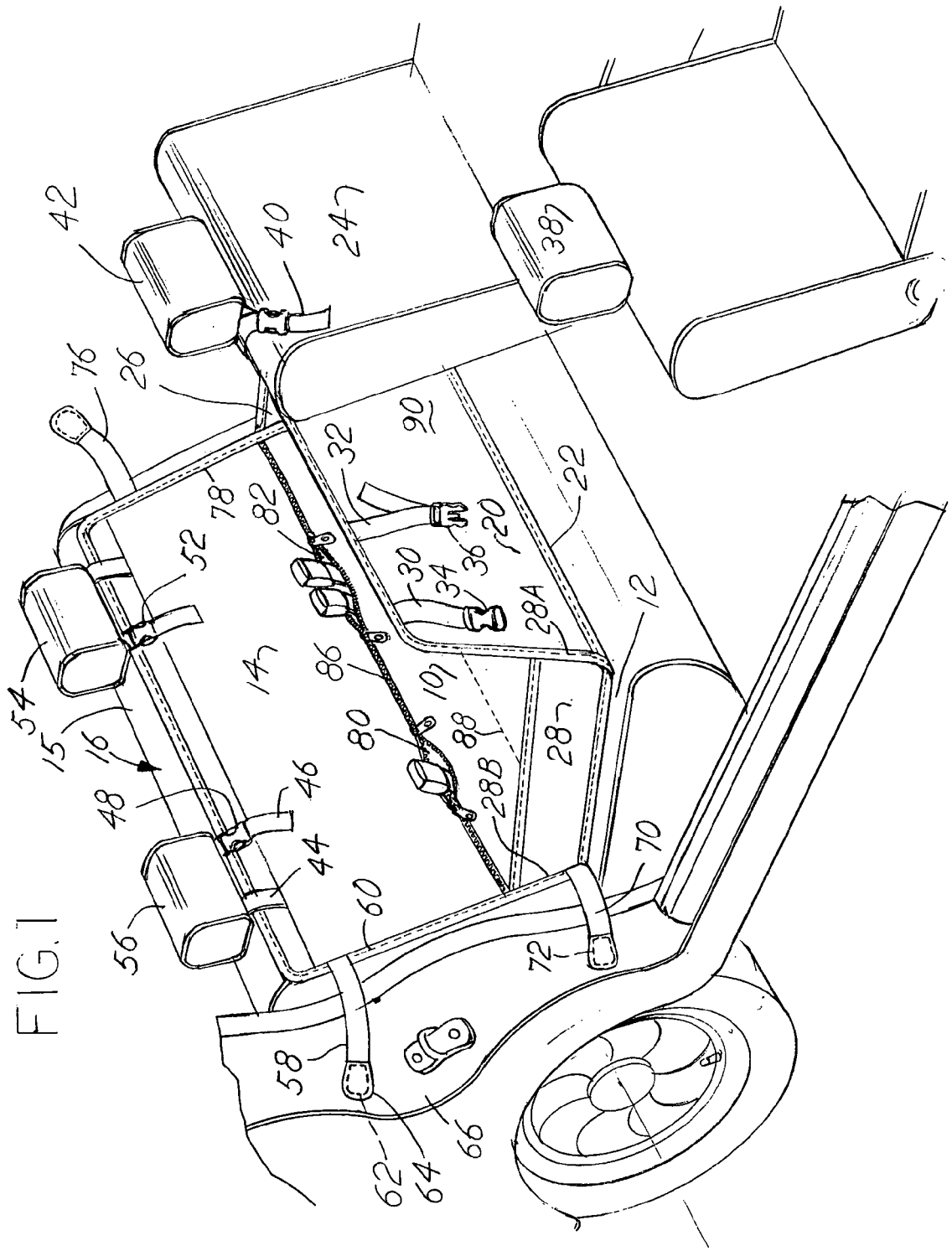
FIG. 1 is an isometric view of the sling construction of the invention positioned within the back seat of a motor vehicle.

Referring to the figures, the sling construction or "hammock" of the invention includes a lower or bottom panel 10 which is sized and designed to fit on the generally horizontal seat portion of the back seat of a vehicle. The bottom panel 10 is typically a rectangular shape and dimensioned so that it covers the seat portion 12. The bottom panel 10 is connected to a generally upright or vertical back panel 14, which has a generally rectangular shape in a preferred embodiment, and which is sized to fit against the generally vertical back support section 16 of the back seat of a motor vehicle.

In a similar fashion, a front panel 20 is attached to the bottom panel 10. The front panel 20 is generally rectangular in shape and is attached by binding and stitching to the front edge 22 of the bottom panel 10. The front panel 20 is sized so that it will extend upwardly from the bottom panel 10 an appropriate height not exceeding the height of the front seat back rest, for example, front seat back rest 24.

The sling construction further includes a first lateral side web or panel 26 connecting the front panel 14, bottom panel 10 and front panel 20. In similar fashion, the opposite side of the sling construction or hammock includes a lateral side web or panel 28 which, in like manner, is stitched and attached to the back panel 14, bottom panel 10 and front panel 20. Thus, a five-sided, open top compartment is provided forming a hammock or enclosure in which an animal may be retained. The configuration of the sling is generally that of a skewed parallelepiped. However, the arrangement of panels and shape of the panels may be varied without departing from the spirit and scope of the invention. Also, the side panels 26 and 28 may be detachably connected along one or more sides thereof. For example, in FIG. 1, sides 28A and 28B may be zipper seams.

The front panel 20 further includes straps such as straps 30 and 32 which may be connected together by means of buckle elements 34 and 36 and fitted around the headrest 38 of the passenger side of the front seat. Similarly, a strap and fastening mechanism 40 fits around a headrest 42 associated with the driver's side of the front seat of the motor vehicle.

In similar fashion, the back panel 14 includes straps such as straps 44 and 46 connected by a fastening or buckle mechanism 48 for fitting about headrest 50 associated with the backrest 15 of the back seat 16. An additional fastening mechanism 52 attaches the opposite side of the back panel 14 to or around back seat headrest 54.

Lateral side straps such as lateral side strap 58 are attached to the side edge 60 of back panel 14. The strap 58 includes a magnet 62 retained within a pocket 64 attached to the end of strap 58. The magnet 62 enables and secures attachment of the strap 58 to the steel chassis 66 of the motor vehicle. In similar fashion, a strap 70 attached to the lower side edge 60 of back panel 14 includes a magnet 72 which enables attachment of the strap 70 to the chassis of the vehicle. In this manner, the side of the back panel 14 is retained so as to insure maintenance of the sling construction or hammock in an open condition. Similar side straps such as side strap 76 are provided on the opposite edge or side 78 of the back panel 14.

The back panel 14 includes zipper openings such as openings 80 and 82 in a seam 86 slightly above the seam 88 connecting the back panel 14 to the bottom panel 10. The seam 86 may, in fact, be positioned within the seam 88 or above the seam 88 as depicted in FIG. 1.

Figure 5:
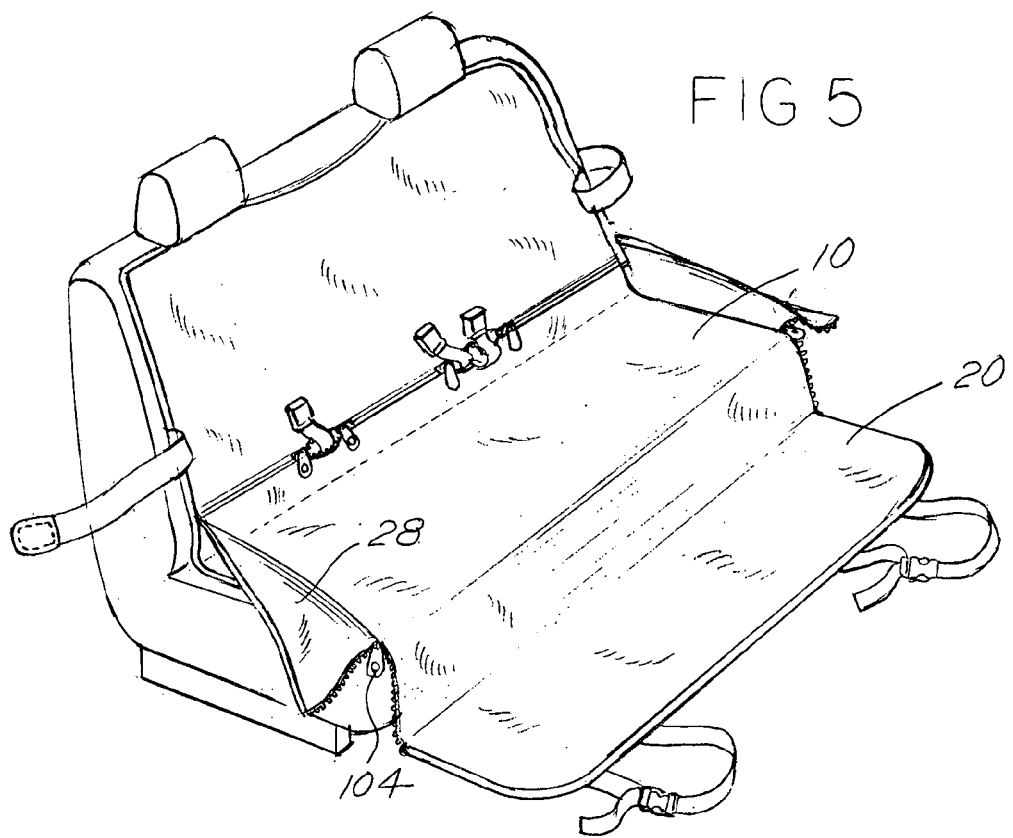
FIG. 5 is an isometric view of the sling construction of FIG. 1 wherein the sling construction has been detached from the vehicle front seat and folded in a manner to enable the seat construction to comprise a cover for the vehicle back seat wherein a passenger may sit on the cover and still utilize the seatbelts in the back seat of the vehicle.
Figure 6:
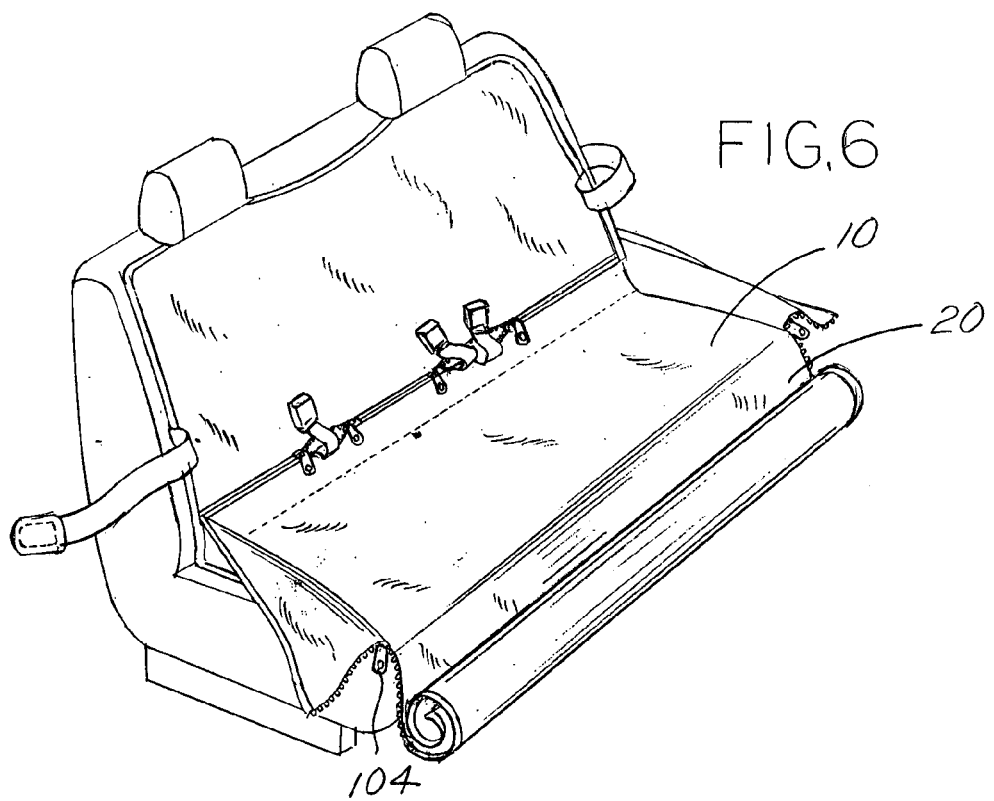
FIG. 6 is an isometric view of the sling construction of FIG. 5 in a folded condition to enable a passenger to sit on the sling.

It is to be noted that the lateral side panels 26 and 28 are of a reduced height relative to the front side panel 20 and back side panel 14. This enables ease of access to the sling construction. Further, all of the panels are constructed or configured of a flexible or fabric material. This enables the front panel 20 and lateral side panel 26 and 28, for example, to be folded down as depicted in FIGS. 5 and 6 to enable use of the sling construction as a seat cover for a passenger who would sit on the outside face 90 of the front panel. The sling construction otherwise, as depicted in FIG. 1, provides a means to protect the upholstery within the vehicle and protects an animal retained within the sling construction. Further, the animal may be attached to a seatbelt via a leash. This enables safe retention of the animal within the sling construction while permitting the animal to move appropriately.

Figure 2:
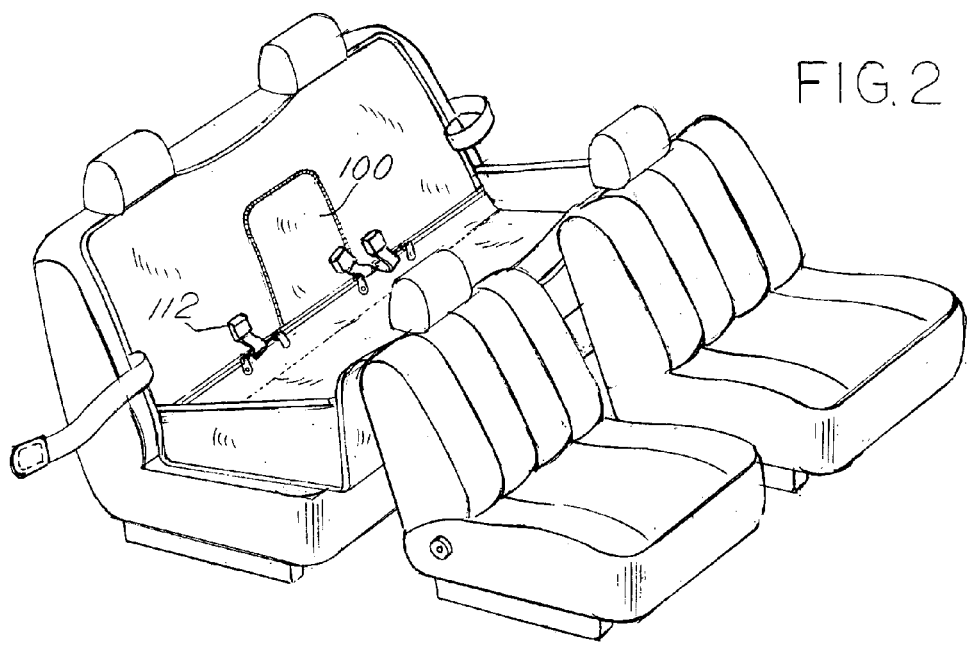
FIG. 2 is an isometric view of the sling construction of FIG. 1 as installed in a motor vehicle.
Figure 3:
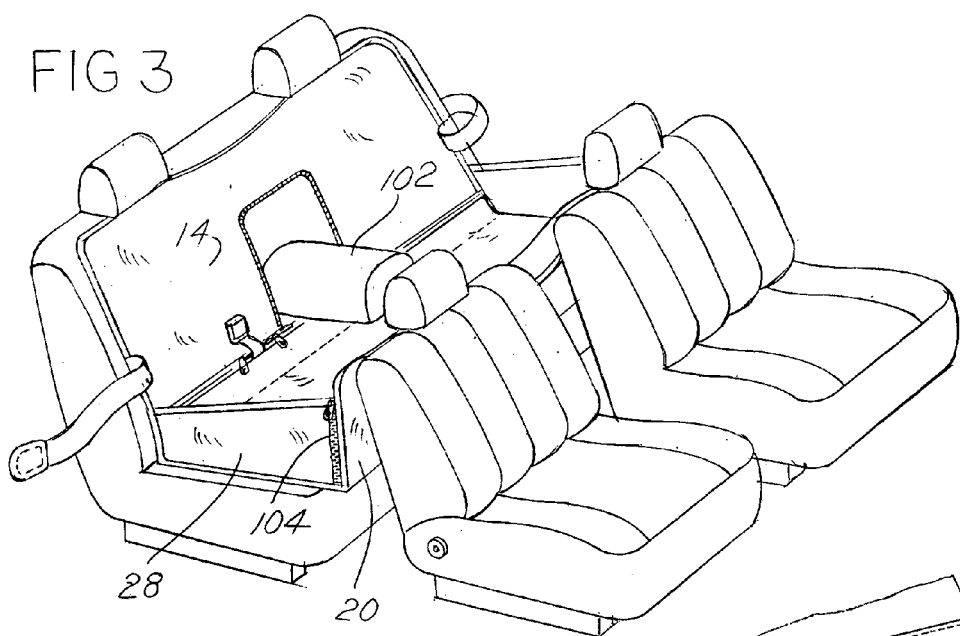
FIG. 3 is an isometric view similar to FIG. 2 wherein a center panel associated with the vertical or generally vertical back portion of the sling construction is opened for placement of an arm rest.

Referring to FIGS. 2 and 3, the back panel 14 may include center access panel 100 attached, for example, by means of a zipper. The center access panel 100 may be opened as depicted in FIG. 3 so that a center arm rest 102 may be lowered. Note also when referring to FIG. 3 that a zipper 104 may be utilized to attach the front edge of a side panel 28 to a front panel 20.

Figure 4:
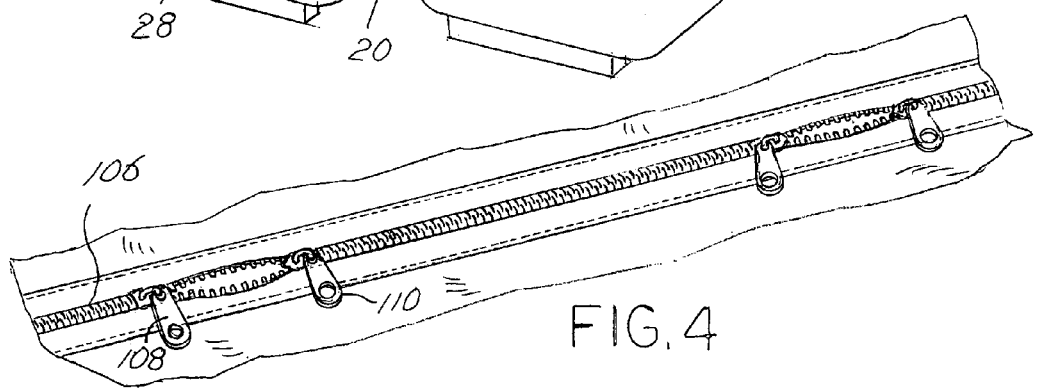
FIG. 4 is an enlarged isometric view of the zipper construction associated with a seam in the back panel of the sling construction.

FIG. 4 illustrates in greater detail the construction of a zipper seam 106 having first and second zippers 108 and 110 which enable opening and closing of the zipper seam 106 so that seat belts, for example, seat belts 112 in FIG. 2, to be made available for use.

FIGS. 5 and 6 illustrate in greater detail the manner in which the bottom panel 10 may be folded, more particularly the front panel 20 may be detached from side panels 28 and 26 by operation of the zipper 104. This enables the front panel 20 to be folded down on the floor of a vehicle and as depicted in FIG. 6, rolled up to fit under or adjacent the edge of the seat of the vehicle.

Figure 7:
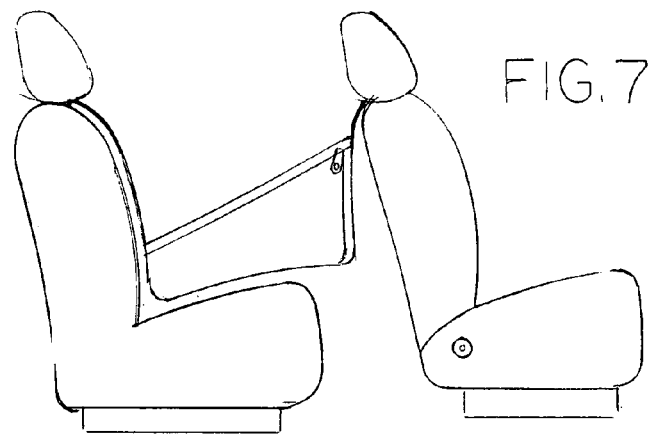
FIG. 7 is a side elevation of the sling construction positioned for receipt of a pet.
Figure 8:
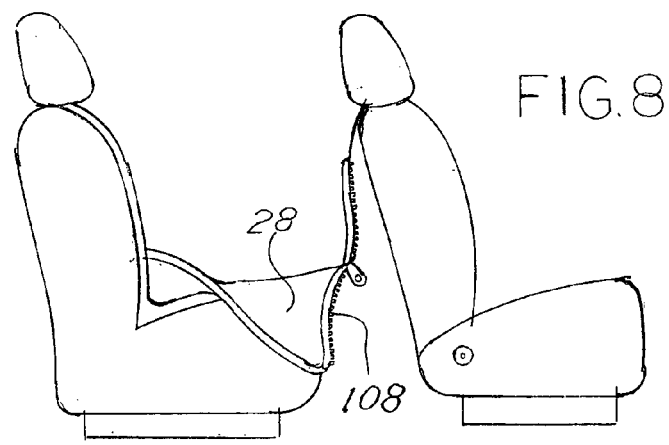
FIG. 8 is a side elevation of the sling construction positioned for entry into the sling.
Figure 9:
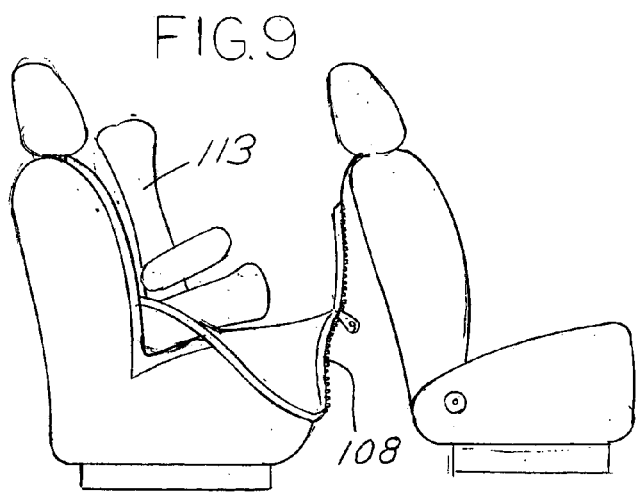
FIG. 9 is a side elevation of the sling construction wherein an infant seat has been positioned in the sling construction.
Figure 10:
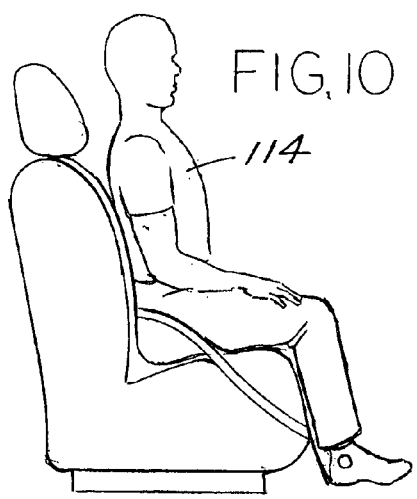
FIG. 10 is a side elevation illustrating the manner in which an individual would sit in the back seat of a vehicle utilizing the sling construction which has been opened in the manner depicted in FIG. 6.

FIGS. 8-10 illustrate the various alternative modes of operation of the sling construction. As shown in FIG. 7, the sling construction is held in place between the front and back seat by virtue of straps which suspend it between the headrests. FIG. 8 depicts the manner in which side panel 28 may be released or opened when the pet is initially placed in the back seat, for example. FIG. 9 illustrates the manner in which the back seat may be used to accommodate a child's seat, for example, the child seat 113 which will be retained by seat belt straps on the sling construction. The combination of utilizing the sling construction along with a child's seat would potentially enhance the safety of a child in the seat should the child accidentally slip from the seat during travel.

FIG. 10 illustrates the manner in which an individual 114 would sit in the back seat in the event the sling construction is detached as depicted, for example, in FIGS. 5 and 6.

Figure 11:
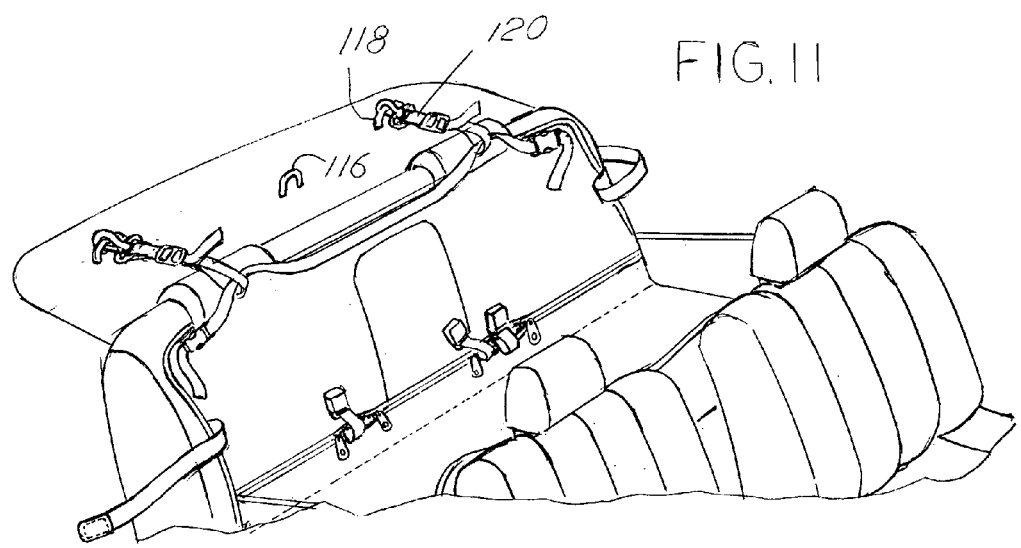
FIG. 11 is an isometric view of an alternative sling construction wherein straps are provided for attaching the vertical back panel thereof to hooks in that circumstance where there are no back seat headrests.
Figure 12:
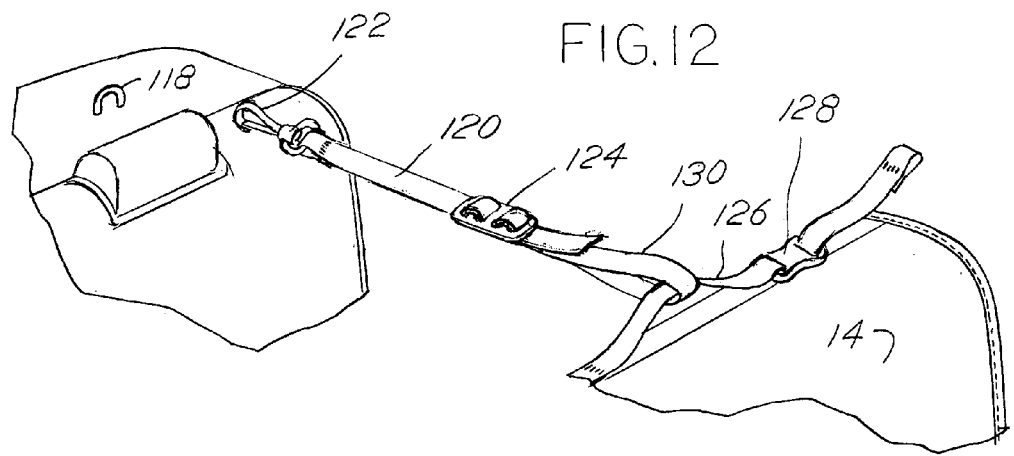
FIG. 12 is an enlarged isometric view of a construction of the type depicted in FIG. 11 for attaching the sling construction to hooks behind the back seat.

Next referring to FIGS. 11 and 12 there are circumstances where the sling construction may not be attachable to a headrest of a back seat inasmuch as such headrests are not available. In such circumstance, the headrest of such a vehicle will generally include loops or hooks such as loops or hooks 116 and 118 to which a strap 120 could be attached. As depicted in FIG. 12, the strap 120 includes a buckle 122 which cooperates with and is attachable to a hook 118. The strap 120 is adjustable by means of the adjustable length mechanism 124. The strap 120 is attachable to a secondary strap member 126 attached to the edge of the vertical or nearly vertical panel 14 of the sling construction as depicted in FIG. 11. The strap 120 is also adjustable in length and may also be detached inasmuch as the buckle 128 may be disconnected so that the strap 126 will fit through a loop 130 defined in the strap 120.

Various types of strap, buckle and loop mechanisms may be utilized in combination with the various panels forming the sling construction. The sling construction may be attached to the front and back seats themselves or to the headrests associated with the seats or the hooks which are somehow incorporated in the various seats. The side panels 26 and 28 are at least partially detachable and foldable so as to enable improved access to the sling construction and so as to enable, for example, a passenger to sit on the sling construction when it is in the condition such as exemplified by FIGS. 5 and 6. In the preferred embodiment, the various panels forming the bottom front side and back side of the sling are generally quadrilateral and designed to be foldable for storage when not in use.

Referring to FIG. 6, it is possible to provide a means for rolling or folding the front side panel and for retaining that front side panel in the rolled condition. For example, a hook and loop strap construction can be utilized to hold the rolled or folded panel in a manner which will facilitate placement against the back seat and underneath the feet of an individual sitting in the back seat.

Variations and modifications may be made to the construction as described. The shaping of the panels may be varied. The arrangement and attachment of straps and fastening mechanisms may be varied. Thus, the invention is to be limited only by the following claims and equivalents thereof.

What is claimed is:

1. A sling construction for positioning on a vehicle seat having a seat portion and a back rest portion extending upwardly from the seat portion, said sling construction constructed for holding a pet comprising, in combination:
   a bottom, generally quadrilateral configured flexible material panel, sized to fit upon a vehicle seat to provide a generally horizontal platform on said seat, said bottom panel including a front, longitudinal edge, a generally parallel back longitudinal edge, a first lateral side edge connecting the front edge and the back edge, and a second lateral side edge spaced from the first side edge and also connecting the front edge and back edge;
   a front side flexible material panel connected to the bottom panel front edge and extendable upwardly from the bottom panel;
   a first connection mechanism for attaching the front side panel at the back side of a vehicle seat and thereby supporting the front side panel extending upward from the bottom panel in a manner maintaining the bottom panel on the seat;
   a back side flexible material panel connected to the bottom panel back edge and extendable upwardly from the bottom panel;
   each of said panels comprised of solely of a flexible material which is foldable to form a seat cover upon release of the first connection mechanism;
   a second connection mechanism for attaching the back side panel at the front side of the back rest of said seat and thereby supporting the back side panel extending upward from the bottom panel, said panels thereby providing a three sided sling between the seats for maintaining a pet therein;
   a third connection mechanism for attaching the back side panel to the opposite lateral sides of a vehicle to thereby retain the back side against the back rest of the vehicle seat, whereby a pet may be maintained in said sling construction of flexible material and said sling construction will remain in an open condition during sudden vehicle stops; and
   a first and second connecting side panel members connecting the front panel and back panel at the first and second lateral side edges respectively, said side panels being at least partially detachable.

2. The sling construction of claim 1 farther including at least one passage in a panel for a vehicle seat belt to fit into the interior of the sling.

3. The sling construction of claim 1 wherein the third connection mechanism comprises at least one strap extending from a panel and including a magnetic attachment device for attachment to the vehicle.

4. The sling construction of claim 1 wherein at least one of said first and second connection mechanisms comprise an adjustable strap.

5. The sling of claim 4 wherein the third connection mechanism comprises at least one strap extending from a panel and including a magnetic device for attachment to a vehicle.

6. The sling of claim 4 including at least one passage in a panel for a vehicle seat belt.

7. The sling construction of claim 1 wherein at least one connection mechanism comprises a strap and releasable buckle.

8. A sling construction for positioning on a vehicle seat having a seat portion and a back rest portion extending upwardly from the seat portion, said construction holding a pet comprising, in combination:
   a bottom, generally quadrilateral configured flexible material panel, sized to fit upon a vehicle seat to provide a generally horizontal platform on said seat, said bottom panel including a front, longitudinal edge, a generally parallel back longitudinal edge, a first lateral side edge connecting the front edge and the back edge, and a second lateral side edge spaced from the first side edge and also connecting the front edge and back edge;
   a front side flexible material panel connected to the bottom panel front edge and extendable upwardly from the bottom panel;
   a first connection mechanism for attaching the front side panel at the back side of a vehicle seat to thereby support the front side panel extending upward from the bottom panel in a manner maintaining the bottom panel on the seat;
   a back side flexible material panel connected to the bottom panel back edge and extendable upwardly from the bottom panel;
   a second connection mechanism for attaching the back side panel at the front side of the back rest of said seat to thereby support the back side panel extending upward from the bottom panel, said panels thereby providing a three sided sling between the seats for maintaining a pet therein;
   a third connection mechanism for attaching the back side panel to the opposite lateral sides of a vehicle to thereby retain the back side against the back rest of the vehicle seat, whereby a pet may be maintained in said sling and said sling will remain in an open condition during sudden vehicle stops;
   a first lateral side web flexible material panel along the first lateral side edge and attached to the first lateral side edge, the front panel and back panel;
   a second lateral side web flexible material panel along the second lateral side edge and attached to the second lateral side edge, the front panel and back panel, said first and second side web panels at least partially detachable;
   said side web panels, front panel, back panel and bottom panel forming a hammock type enclosure;
   each of said panels comprised solely of a flexible material which is foldable to form a seat cover upon release of the first connection mechanism;
   a first lateral side strap for attaching the back panel to one side of a vehicle;

a second lateral side strap for attaching the back panel to the other side of the vehicle; and at least one of said panels including at least one through passage opening to the seat for insertion of a seatbelt.

9. The sling construction of claim 8 wherein said connection mechanisms comprise a strap member.

10. The sling construction of claim 9 wherein said strap members include a releasable buckle.

11. The sling construction of claim 10 wherein said lateral side straps include a magnetic member for attachment to the vehicle.

12. The sling construction of claim 8 wherein said lateral side straps include a magnetic member for attachment to the vehicle.

13. A sling construction for positioning on a vehicle seat having a seat portion and a back rest portion extending upwardly from the seat portion, said sling construction constructed for holding a pet comprising, in combination:

a bottom, generally quadrilateral configured panel, sized to fit upon a vehicle seat to provide a generally horizontal platform on said seat, said bottom panel including a front, longitudinal edge, a generally parallel back longitudinal edge, a first lateral side edge connecting the front edge and the back edge, and a second lateral side edge spaced from the first side edge and also connecting the front edge and back edge;

a front side panel connected to the bottom panel front edge and extendable upwardly from the bottom panel;

a first connection mechanism for attaching the front side panel at the back side of a vehicle seat and thereby supporting the front side panel extending upward from the bottom panel in a manner maintaining the bottom panel on the seat;

a back side panel connected to the bottom panel back edge and extendable upwardly from the bottom panel, said back side panel including a detachable interior panel which may be at least partially detached from the back panel for access to the back rest portion of a seat;

a second connection mechanism for attaching the back side panel at the front side of the back rest of said seat and thereby supporting the back side panel extending upward from the bottom panel, said panels thereby providing a three sided sling between the seats for maintaining a pet therein; and a third connection mechanism for attaching the back side panel to the opposite lateral sides of a vehicle to thereby retain the back side against the back rest of the vehicle seat, whereby a pet may be maintained in said sling construction and said sling construction will remain in an open condition during sudden vehicle stops.

14. The sling construction of claim 13 further including at least one connecting web member between the front panel and back panel.

15. The sling construction of claim 13 further including at least one passage in a panel for a vehicle seat belt to fit into the interior of the sling.

16. The sling construction of claim 13 wherein each of the panels are comprised solely of a foldable, flexible material.

17. A sling construction for positioning on a vehicle seat having a seat portion and a back rest portion extending upwardly from the seat portion, said construction holding a pet comprising, in combination:

a bottom, generally quadrilateral configured panel, sized to fit upon a vehicle seat to provide a generally horizontal platform on said seat, said bottom panel including a front, longitudinal edge, a generally parallel back longitudinal edge, a first lateral side edge connecting the front edge and the back edge, and a second lateral side edge spaced from the first side edge and also connecting the front edge and back edge;

a front side panel connected to the bottom panel front edge and extendable upwardly from the bottom panel;

a first connection mechanism for attaching the front side panel at the back side of a vehicle seat to thereby support the front side panel extending upward from the bottom panel in a manner maintaining the bottom panel on the seat;

a back side panel connected to the bottom panel back edge and extendable upwardly from the bottom panel, said back panel including a detachable interior panel which may be at least partially detached from the back panel for access to the back rest portion of a backseat;

a second connection mechanism for attaching the back side panel at the front side of the back rest of said seat to thereby support the back side panel extending upward from the bottom panel, said panels thereby providing a three sided sling between the seats for maintaining a pet therein;

a third connection mechanism for attaching the back side panel to the opposite lateral sides of a vehicle to thereby retain the back side against the back rest of the vehicle seat, whereby a pet may be maintained in said sling and said sling will remain in an open condition during sudden vehicle stops;

a first lateral side web panel along the first lateral side edge and attached to the first lateral side edge, the front panel and back panel;

a second lateral side web panel along the second lateral side edge and attached to the second lateral side edge, the front panel and back panel;

said side web panels, front panel, back panel and bottom panel forming a hammock type enclosure, at least one of said side web panels at least partially detachable;

a first lateral side strap for attaching the back panel to one side of a vehicle;

a second lateral side strap for attaching the back panel to the other side of the vehicle; and at least one of said panels including at least one through passage opening to the seat for insertion of a seatbelt.

18. The sling construction of claim 17 wherein said lateral side straps include a magnetic member for attachment to the vehicle.

19. A sling construction for positioning on a vehicle seat having a seat portion and a back rest portion extending upwardly from the seat portion, said construction holding a pet comprising, in combination:

a bottom, generally quadrilateral configured panel, sized to fit upon a vehicle seat to provide a generally horizontal platform on said seat, said bottom panel including a front, longitudinal edge, a generally parallel back longitudinal edge, a first lateral side edge connecting the front edge and the back edge, and a second lateral side edge spaced from the first side edge and also connecting the front edge and back edge;

a front side panel connected to the bottom panel front edge and extendable upwardly from the bottom panel;

a first connection mechanism for attaching the front side panel at the back side of a vehicle seat to thereby support the front side panel extending upward from the bottom panel in a manner maintaining the bottom panel on the seat;

a back side panel connected to the bottom panel back edge and extendable upwardly from the bottom panel, said back panel including a detachable interior panel which may be at least partially detached from the back panel for access to the back rest portion of a seat;

a second connection mechanism for attaching the back side panel at the front side of the back rest of said seat to thereby support the back side panel extending upward from the bottom panel, said panels thereby providing a three sided sling between the seats for maintaining a pet therein;

a third connection mechanism for attaching the back side panel to the opposite lateral sides of a vehicle to thereby retain the back side against the back rest of the vehicle seat, whereby a pet may be maintained in said sling and said sling will remain in an open condition during sudden vehicle stops;

a first lateral side web panel along the first lateral side edge and attached to the first lateral side edge, the front panel and back panel;

a second lateral side web panel along the second lateral side edge and attached to the second lateral side edge, the front panel and back panel;

said side web panels, front panel, back panel and bottom panel forming a hammock type enclosure;

a first lateral side strap for attaching the back panel to one side of a vehicle;

a second lateral side strap for attaching the back panel to the other side of the vehicle; and at least one of said panels including at least one through passage opening to the seat for insertion of a seatbelt.

20. The sling construction of claim 19 wherein said lateral side straps include a magnetic member for attachment to the vehicle.

21. The sling construction of claim 19 wherein the side panels are at least partially detachable.

* * * * *